(12) United States Patent
Brehm et al.

(10) Patent No.: US 7,706,076 B2
(45) Date of Patent: Apr. 27, 2010

(54) OPTICAL SYSTEM

(75) Inventors: Michael Brehm, Goettingen (DE); Rolf Wartmann, Waake (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 485 days.

(21) Appl. No.: 11/664,734

(22) PCT Filed: Sep. 21, 2005

(86) PCT No.: PCT/EP2005/010192

§ 371 (c)(1),
(2), (4) Date: Apr. 4, 2007

(87) PCT Pub. No.: WO2006/037471

PCT Pub. Date: Apr. 13, 2006

(65) Prior Publication Data

US 2009/0225408 A1      Sep. 10, 2009

(30) Foreign Application Priority Data

Oct. 4, 2004 (DE) .................. 10 2004 048 844

(51) Int. Cl.
*G02B 21/02* (2006.01)
*G02B 21/00* (2006.01)
(52) U.S. Cl. .................. 359/657; 359/656; 359/368
(58) Field of Classification Search ......... 359/656–661, 359/368
See application file for complete search history.

(56) References Cited

U.S. PATENT DOCUMENTS

| 4,232,937 | A | 11/1980 | Swaminathan et al. |
| 5,777,784 | A | 7/1998 | Tanaka |
| 6,280,058 | B1 | 8/2001 | Horigome |
| 2003/0021035 | A1 | 1/2003 | Kusaka et al. |
| 2005/0025026 | A1* | 2/2005 | Hirai .................. 369/112.02 |

FOREIGN PATENT DOCUMENTS

| JP | 2000-10012 | 1/2000 |
| JP | 2003-156691 | 5/2003 |

* cited by examiner

*Primary Examiner*—William C Choi
(74) *Attorney, Agent, or Firm*—Frommer Lawrence & Haug

(57) ABSTRACT

An optical system for arranging between a light source and a field diaphragm in an illumination beam path of a microscope comprises n imaging optical elements with focal lengths $f_i$ and Abbe numbers $v_i$ ($i=1,\ldots,n$). The following relationship is met for the optical system:

$$\sum_{i=1}^{n} \frac{h_i}{f_i \cdot v_i} \leq 0.07,$$

where $h_i$ is one half of the bundle diameter of a bundle of light rays proceeding from a point of the light source at the entrance to the imaging optical element i.

8 Claims, 1 Drawing Sheet

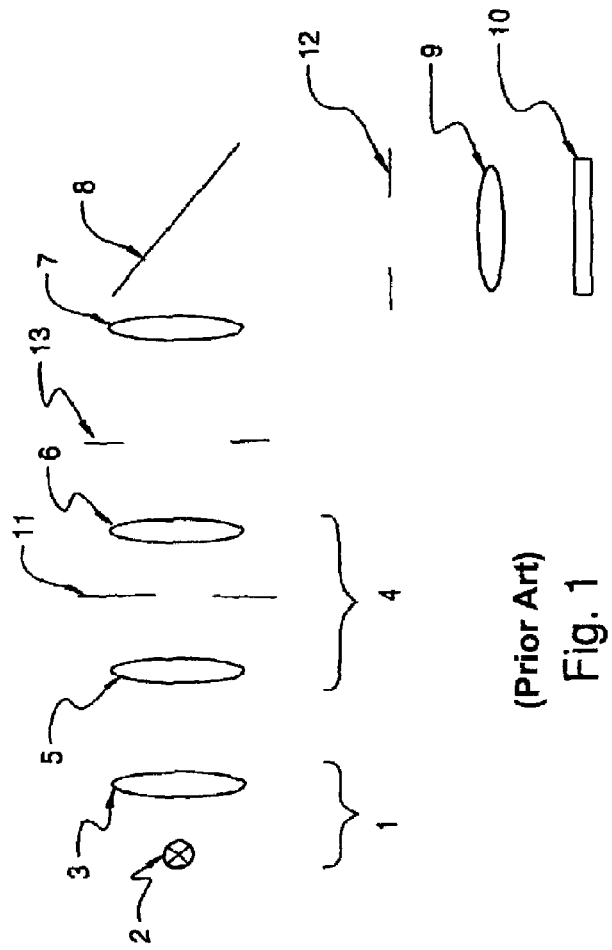
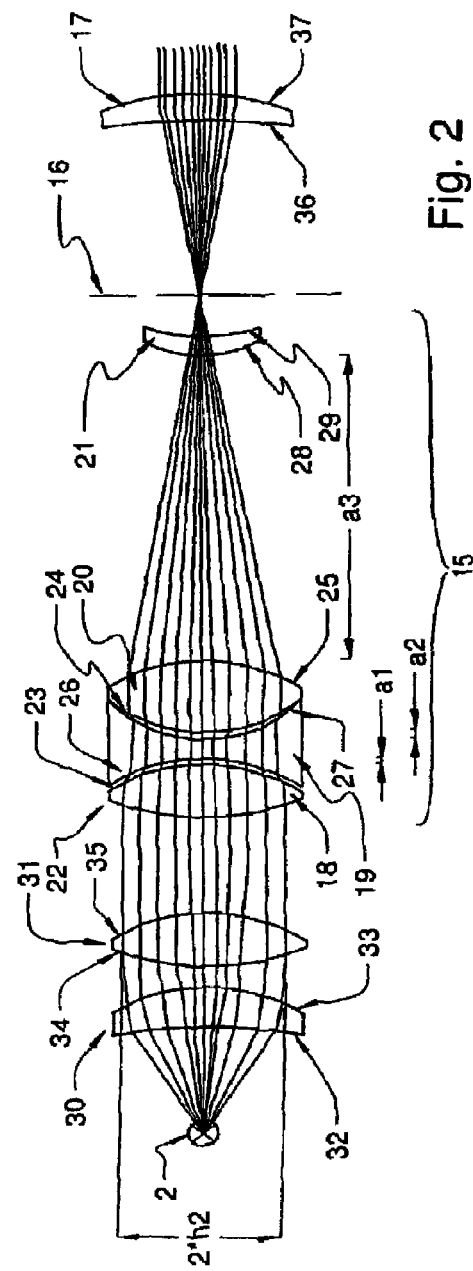
Fig. 1 (Prior Art)
Fig. 2

OPTICAL SYSTEM

CROSS-REFERENCE TO RELATED APPLICATIONS

This application claims priority of International Application No. PCT/EP2005/010192, filed Sep. 21, 2005 and German Application No. 10 2004 048 844.4, filed Oct. 4, 2004, the complete disclosures of which are hereby incorporated by reference.

BACKGROUND OF THE INVENTION a) Field of the Invention

The present invention is directed to an optical system for an illumination device of a microscope.

b) Description of the Related Art

To examine a specimen with a microscope, the specimen is usually illuminated by means of an illumination arrangement. In transmitted illumination, the light of the illumination arrangement is radiated through the specimen, whereas in incident illumination the illumination arrangement radiates light on the surface of the specimen that is examined by means of the microscope. Different requirements are imposed on the illumination arrangement for different illumination situations in incident light studies, for example, illumination for fluorescence microscopy at different wavelengths, dark-field illumination, white-light incident illumination, or structured incident illumination at different wavelengths.

In view of the different requirements for incident illumination, the construction shown schematically in FIG. 1 has proven useful. An illumination unit 1 with a light source 2 radiates a bundle of light rays on an optical system 4 with a collector 3 that images the light source 2 to infinity. First partial optics 5 generate an intermediate image of the light source 2 in an intermediate image plane and the intermediate image is imaged to infinity by second partial optics 6. The bundle of light rays exiting from the second partial optics 6 is deflected by a tube lens 7 and a semitransparent mirror 8 to the objective 9 and, after passing through the objective 9, illuminates an object 10. In conformity to the basic rules of Köhler illumination, an aperture diaphragm 11 is arranged in the intermediate image plane between the partial optics 5 and 6. The second partial optics 6 and the tube lens 7 image the intermediate image of the light source 2 in the objective pupil 12. This construction makes it possible to place a field diaphragm 13 in a plane in which a sharp intermediate image of the objective image is formed, namely, in the focal plane of the tube lens 7. Since a diffraction-limited intermediate image of the objective image is present in this plane, structures can be arranged which are then imaged with absolute sharpness on the object.

As a rule, neither the collector nor the partial optics are achromatic for reasons of cost. This leads to severe longitudinal chromatic aberrations of the light source image in the objective pupil. Particularly in illumination for fluorescence studies, these longitudinal chromatic aberrations cause a highly inhomogeneous illumination of the object field. This can only be avoided by readjusting the light source every time a filter is changed. This process is very cumbersome and makes the use of fast filter changers practically impossible.

This disadvantage can be overcome by using special collectors which are achromatic at least to the extent that the longitudinal chromatic aberration in the objective pupil is tolerable. However, such collectors have a very complicated construction.

Further, an intermediate image plane of the object image lies between the partial optics and the collector. Impurities in this intermediate image plane are imaged sharply on the object and considerably impede observation of the object. Elements of the achromatic collectors inevitably approach very close to this intermediate image plane, which leads to considerable problems with respect to the cleanliness of the collector lenses.

OBJECT AND SUMMARY OF THE INVENTION

Therefore, it is the primary object of the present invention to provide means for illuminating an object in microscopic examination which make it possible to illuminate in the wavelength range from 350 nm to 750 nm extensively without troublesome longitudinal chromatic aberrations in the objective pupil.

This object is met through an optical system for arranging between a light source and a field diaphragm in an illumination beam path of a microscope which comprises n imaging optical elements with focal lengths $f_i$ and Abbe numbers $v_i$ ($i=1, \ldots, n$) and for which the following relationship is met:

$$\sum_{i=1}^{n} \frac{h_i}{f_i \cdot v_i} \leq 0.07,$$

where $h_i$ is one half of the bundle diameter of a bundle of light rays proceeding from a point of the light source at the entrance to the imaging optical element i. By the entrance to the lens is meant the location on the optical axis where the ray of the bundle of light rays that is at the greatest distance from the optical axis enters the lens. The focal length and the Abbe number are preferably given with reference to the yellow d-line of helium or the green e-line of mercury, i.e., wavelength 587.6 nm or 546.1 nm, respectively. By the Abbe number for the e-line, i.e., the green mercury line at 546.7 nm, is meant within the framework of the present invention, the Abbe number given by $$v = \frac{n_e - 1}{n_{F'} - n_{C'}},$$

where $n_{F'} - n_{C'}$ is the difference of the refractive indices for the cadmium lines F' and C' at 479.99 nm and 643.85 nm, respectively, and $n_e$ is the refractive index for the green mercury line. By the Abbe number for the d-line, i.e., the yellow helium line at 587.6 nm, is meant within the framework of the present invention the Abbe number given by $$v = \frac{n_d - 1}{n_F - n_C},$$

where $n_F - n_C$ is the difference of the refractive indices for the hydrogen lines F and C at 486.1 nm and 656.3 nm, respectively, and $n_d$ is the refractive index for the yellow helium line at 587.6 nm.

The system according to the invention carries out the function of a condenser in that it allows a uniform illumination of an object plane of a microscope or of a plane conjugate to the object plane. It is approximately apochromatic and makes it possible to image the light source in the intermediate image plane, or in an aperture diaphragm arranged therein, with only minor spherical aberrations and longitudinal chromatic aberrations or even with none at all. The imaging in the objective pupil is then corrected spherically as well as chromatically.

The system according to the invention can be used in particular for incident illumination in a microscope.

In the optical system according to the invention, the n optical elements preferably comprise a partial system which serves to image the light source from infinity to an intermediate image in the optical system, has a focal length f and comprises in direction of the beam path proceeding from the light source: a first converging lens with a focal length $f_1$ where $0.3\ f < f_1 < 0.7\ f$, a diverging lens with a focal length $f_2$ where $-0.2\ f < f_2 < -0.4\ f$, a second converging lens with a focal length $f_3$ where $0.3\ f < f_3 < 0.7\ f$, and a third converging lens with a focal length $f_4$ where $0.8\ f < f_4 < 2\ f$, wherein the distance of the third converging lens from the second converging lens is between 0.6 f and 1.2 f. By the distance between two lenses is meant the distance on the optical axis of the surfaces of the lenses facing one another.

The optical system can further have a collector portion in front of the optical partial system which images the light source to infinity and, behind the optical partial system, another optical partial system which images the intermediate image generated by the optical system to infinity. Since the image of the light source in the intermediate image plane is already extensively corrected spherically and chromatically, no special requirements need be imposed on this additional optical system.

The optical partial system of the optical system according to the invention preferably has exactly four lenses.

In order to achieve imaging without longitudinal chromatic aberrations as far as possible, the material of the first converging lens and second converging lens of the optical partial system has a low dispersion. Accordingly, it is preferable in the optical system according to the invention that the Abbe number of the material of the first and/or second converging lens of the optical partial system is greater than 60.

Further, in order to prevent longitudinal chromatic aberrations as far as possible, it is preferable that the material of the diverging lens of the optical partial system has a high dispersion. In particular, it is preferable that the Abbe number of the material of the diverging lens of the optical partial system is less than 50.

In principle, the third converging lens of the optical partial system need not have an especially low dispersion. To keep longitudinal chromatic aberrations to a minimum, however, it is preferable in the optical system according to the invention that the Abbe number of the third converging lens of the optical partial system is greater than 50.

Aberrations are reduced particularly when the first three lenses of the optical partial system, i.e., the first converging lens, the diverging lens, and the second converging lens, have very small air separations relative to one another. In particular, it is preferable in the optical system according to the invention that the distance between the first converging lens and the diverging lens of the optical partial system and the distance between the diverging lens and the second converging lens of the optical partial system are less than 0.05 f.

An illumination in which aberrations are conspicuously absent is achieved by a preferred embodiment form of the optical system according to the invention in which the optical partial system has a focal length f=50.76 mm and the parameters radius $r_1$ of the entrance surface, thickness d of the lens, radius $r_2$ of the exit surface, distance a to the following lens, refractive index n, and Abbe number ν have the following values:

| Lens | $r_1$ in mm | d in mm | $r_2$ in mm | a in mm | n | ν |
|---|---|---|---|---|---|---|
| first converging lens | 32.08 | 8.00 | −23.21 | 1 | 1.49 | 70.18 |
| diverging lens | −21.91 | 3.00 | 16.55 | 1.11 | 1.65 | 33.6 |
| second converging lens | 18.97 | 11.00 | −23.21 | 46.81 | 1.49 | 70.18 |
| third converging lens | 15.18 | 3.00 | 30.07 | 50.48 | 1.52 | 63.96 |

By refractive index is meant in this connection as well as in the following the index of refraction at 546.1 nm unless otherwise expressly indicated.

Illumination which is especially free from aberrations is achieved in particular in a preferred embodiment form of the optical system according to the invention which has seven lenses and in which the parameters radius $r_1$ of the entrance surface, thickness d of the lens, radius $r_2$ of the exit surface, distance a to the following lens, refractive index n at a wavelength of 546.1 nm, and Abbe number ν have the following values:

| Lens | $r_1$ in mm | d in mm | $r_2$ in mm | a in mm | n | ν |
|---|---|---|---|---|---|---|
| first collector lens | −141.25 | 7.2 | −12.23 | 0.3 | 1.46 | 67.77 |
| second collector lens | 54.25 | 5.8 | −25.12 | 40.09 | 1.52 | 59.22 |
| first converging lens of the first partial system | 32.08 | 8 | −23.21 | 1.00 | 1.49 | 70.18 |
| diverging lens of the first partial system | −21.91 | 3 | 16.55 | 1.11 | 1.65 | 33.6 |
| second converging lens of the first partial system | 18.97 | 11.00 | −23.21 | 46.81 | 1.49 | 70.18 |
| third converging lens of the first partial system | 15.18 | 3 | 30.07 | 50.48 | 1.52 | 63.96 |
| lens of the second partial system | −392.44 | 6.5 | −24.58 | | 1.52 | 63.96 |

The invention will be described more fully in the following by way of example with reference to the drawings.

BRIEF DESCRIPTION OF THE DRAWINGS

In the drawings:

FIG. 1 shows a schematic beam path of an incident illumination according to the prior art; and FIG. 2 shows a schematic view of a condenser according to a preferred embodiment form of the invention.

DESCRIPTION OF THE PREFERRED EMBODIMENTS

FIG. 2 shows a light source 2 with an optical system 14 according to a preferred embodiment form of the invention which is used instead of the collector 3 and partial optics 5 and 6 in FIG. 1.

The optical system 14 has seven lenses and a collector portion for imaging the light source 2 to infinity with a first and second collimator lens 30 and 31, respectively, a first optical partial system 15, which images the image of the light source 2 generated by the collector portion to infinity on an intermediate image plane 16, and a second optical partial system in the form of a lens 17 which images the image of the light source 2 in the intermediate image plane 16 to infinity.

The collector portion and the two optical partial systems are constructed as described in the following. The values indicated in this embodiment example for the refractive index refer to the e-line, i.e., the mercury line at 546.1 nm, the values for the Abbe number refer to the Abbe number in the e-line as described above.

The first lens 30 for the collector portion is a concave-convex lens having a thickness of 7.2 mm, a radius of curvature of 141.25 mm on the concave side 32 and a radius of curvature of −12.23 mm on the convex side 33. The first lens 30 is made of a glass with a refractive index of 1.46 and an Abbe number of 67.77.

The second lens 31 of the collector portion, which is arranged at a distance of 0.3 mm from the first lens of the collector portion, is biconvex with a thickness of 5.8 mm and is bounded on the entrance side facing the light source 2 by a surface 34 with a radius of curvature of 54.25 mm and on the exit side by a surface 35 with a radius of curvature of 25.12 mm. The second lens 31 is made of a glass with a refractive index of 1.52 and an Abbe number of 59.22.

The first optical partial system 15 has four lenses and comprises a first converging lens 18, a diverging lens 19, a second converging lens 20, and a third converging lens 21 considered in the direction of the incoming light.

The first converging lens and second converging lens 18 and 20, respectively, are made of a material, glass in the present example, with low dispersion and with a refractive index of 1.49 and an Abbe number of 70.18.

The entrance-side surface 22 of the first converging lens 18, which is arranged at a distance of 40.09 mm from the second lens 31 of the collector portion, has a radius of 32.08 mm, the second, exit-side surface 23 has a radius of −23.21 mm, and the thickness of the converging lens 18 is 8 mm.

The second converging lens 20 having a thickness of 11 mm is bounded by an entrance-side surface 24 with a radius of 18.97 mm and an exit-side surface 25 with a radius of −23.21.

The diverging lens 19 is made of a material, glass in the example, with a high dispersion having a refractive index of 1.65 and an Abbe number of 33.60. The diverging lens 19 with a thickness of 3 mm is bounded by an entrance-side first surface 26 having a radius −21.91 mm and by an exit-side second surface 27 having a radius of 16.55 mm.

The first converging lens 18 and the diverging lens 19, and diverging lens 19 and the second converging lens 20, are arranged with a small air separation therebetween of a1=1.00 mm and a2=1.11 mm, respectively.

Finally, the third converging lens 21 is arranged at a distance of a3=46.81 mm from the second converging lens 20. It is made of a material, glass in the example, having a low dispersion with a refractive index of 1.52 and an Abbe number of 63.96. The third converging lens 21 with a thickness of 3 mm is bounded by an entrance-side surface 28 with a radius of 15.18 mm and an exit-side surface 29 with a radius of 30.07 mm. The distance from the next optical element, the optical system 17, is 50.48 mm.

The collector portion and the first optical partial system 15 generate a spherically and chromatically corrected image of the light source in the intermediate image plane 16.

The second optical partial system 17 comprises a concave-convex lens which is at a distance of 50.48 mm from the third converging lens 21 and which has a thickness of 6.5 mm and is bounded on the entrance side by a surface 36 with a radius of curvature of 392.44 mm and on the exit side by a surface 37 with a radius of curvature of −24.58 mm. The material of the lens 17 has the same refractive index and the same Abbe number as the material of the third lens 20 of the first partial system 15.

A surface has a negative radius when it curves out in the direction of illumination, i.e., its vertex lies foremost in the illumination direction (see FIG. 2).

A bundle of rays whose cross section changes when passing through each of the lenses of the optical system proceeds from a point of the light source 2 arranged in the focal point of the collector system. In the following, $h_1$ denotes one half of the bundle cross section at the entrance of the respect lens i, i.e., in the plane orthogonal to the optical axis, in which the outermost rays of the bundle enter the lens i (i=1 to 7 in direction of the illumination beam path). The position of the plane is shown by way of example in FIG. 2 for i=2.

In this case, the optical system has the values shown in the following table for the parameters of the lenses radius $r_1$ of the entrance surface, thickness d of the lens, radius $r_2$ of the exit surface, distance a to the following lens, refractive index n at a wavelength of 546.1 nm, and Abbe number $v_e$, the values also shown in the table for the focal length f in mm and one half of the bundle diameter h in mm.

Summation gives:

$$\sum_{i=1}^{n} \frac{h_i}{f_i \cdot v_i} \leq 0.068.$$

The optical system allows a further reduction of longitudinal chromatic aberrations in the objective pupil with illumination in the wavelength range from 350 nm to 750 nm.

While the foregoing description and drawings represent the present invention, it will be obvious to those skilled in the art that various changes may be made therein without departing from the true spirit and scope of the present invention.

| Lens | $r_1$ in mm | d in mm | $r_2$ in mm | a in mm | n | $v_e$ | f in mm | h in mm |
|---|---|---|---|---|---|---|---|---|
| first collector lens | −141.25 | 7.2 | −12.23 | 0.3 | 1.46 | 67.77 | 28.6 | 9.5 |
| second collector lens | 54.25 | 5.8 | −25.12 | 40.09 | 1.52 | 59.22 | 33.57 | 12.49 |
| first converging lens of the first partial system | 32.08 | 8.00 | −23.21 | 1.00 | 1.49 | 70.18 | 28.9 | 10.91 |
| diverging lens of the first partial system | −21.91 | 3.00 | 16.55 | 1.11 | 1.65 | 33.6 | −14.02 | 9.91 |
| second converging lens of the first partial system | 18.97 | 11.00 | −23.21 | 46.81 | 1.49 | 70.18 | 23.34 | 9.95 |
| third converging lens of the first partial system | 15.18 | 3.00 | 30.07 | 50.48 | 1.52 | 63.96 | 55.3 | 2.19 |
| lens of the second partial system | −392.44 | 6.50 | −24.58 |  | 1.52 | 63.96 | 50.25 | 9.9 |

REFERENCE NUMBERS 1 illumination unit
2 light source
3 collector
4 optical system
5 first portion
6 second portion
7 tube lens
8 semitransparent mirror
9 objective
10 object
11 aperture diaphragm
12 objective pupil
13 field diaphragm
14 optical system
15 first optical partial system
16 intermediate image plane
17 second optical partial system
18 first converging lens
19 diverging lens
20 second converging lens
21 third converging lens
22 entrance-side surface
23 exit-side surface
24 entrance-side surface
25 exit-side surface
26 entrance-side surface
27 exit-side surface
28 entrance-side surface
29 exit-side surface
30 first collector lens
31 second collector lens
32 entrance-side surface
33 exit-side surface
34 entrance-side surface
35 exit-side surface
36 entrance-side surface
37 exit-side surface

The invention claimed is:

1. An optical system for arranging between a light source and a field diaphragm in an illumination beam path of a microscope, comprising:

n imaging optical elements with focal lengths $f_i$ and Abbe numbers $v_i$ (i=1, . . . , n) and for which the following relationship is met:

$$\sum_{i=1}^{n} \frac{h_i}{f_i \cdot v_i} \leq 0.07,$$

where $h_i$ is one half of the bundle diameter of a bundle of light rays proceeding from a point of the light source at the entrance to the imaging optical element I;

wherein the n optical elements comprise a partial system which serves to image the light source from infinity to an intermediate image in the optical system, has a focal length f and comprises in direction of the beam path proceeding from the light source: a first converging lens with a focal length $f_1$ where $0.3 \cdot f < f_1 < 0.7 \cdot f$, a diverging lens with a focal length $f_2$ where $-0.2 \cdot f < f_2 < -0.4 \cdot f$, a second converging lens with a focal length $f_3$ where $0.3 \cdot f < f_3 < 0.7 \cdot f$, and a third converging lens with a focal length $f_4$ where $0.8 \cdot f < f_4 < 2 \cdot f$, wherein the distance of the third converging lens from the second converging lens (20) is between $0.6 \cdot f$ and $1.2 \cdot f$.

2. The optical system according to claim 1;

wherein the Abbe number of the material of the first and/or second converging lens of the optical partial system is greater than 60.

3. The optical system according claim 1;

wherein the Abbe number of the material of the diverging lens of the optical partial system is less than 50.

4. The optical system according to claim 1;

wherein the Abbe number of the third converging lens of the optical partial system is greater than 50.

5. Optical system according to claim 1;

wherein the distance between the first converging lens and the diverging lens of the optical partial system and the distance between the diverging lens and the second converging lens of the optical partial system are less than $0.05 \cdot f$.

6. The optical system according to claim 1;

wherein the optical partial system has a focal length f=50.76 mm and the parameters radius $r_1$ of the entrance surface, thickness d of the lens, radius $r_2$ of the exit surface, distance a to the following lens, refractive index n at a wavelength of 546.1 nm, and Abbe number v have the following values:

| Lens | $r_1$ in mm | d in mm | $r_2$ in mm | a in mm | n | ν |
|---|---|---|---|---|---|---|
| first converging lens | 32.08 | 8.00 | −23.21 | 1 | 1.49 | 70.18 |
| diverging lens | −21.91 | 3.00 | 16.55 | 1.11 | 1.65 | 33.6 |
| second converging lens | 18.97 | 11.00 | −23.21 | 46.81 | 1.49 | 70.18 |
| third converging lens | 15.18 | 3.00 | 30.07 | 50.48 | 1.52 | 63.96. |

7. The optical system according to claim 1, which has seven lenses and in which the parameters radius $r_1$ of the entrance surface, thickness d of the lens, radius $r_2$ of the exit surface, distance a to the following lens, refractive index n at a wavelength of 546.1 nm, and Abbe number ν have the following values:

| Lens | $r_1$ in mm | d in mm | $r_2$ in mm | a in mm | n | ν |
|---|---|---|---|---|---|---|
| first collector lens | −141.25 | 7.2 | −12.23 | 0.3 | 1.46 | 67.77 |
| second collector lens | 54.25 | 5.8 | −25.12 | 40.09 | 1.52 | 59.22 |
| first converging lens of the first partial system | 32.08 | 8 | −23.21 | 1.00 | 1.49 | 70.18 |
| diverging lens of the first partial system | −21.91 | 3 | 16.55 | 1.11 | 1.65 | 33.6 |
| second converging lens of the first partial system | 18.97 | 11.00 | −23.21 | 46.81 | 1.49 | 70.18 |
| third converging lens of the first partial system | 15.18 | 3 | 30.07 | 50.48 | 1.52 | 63.96 |
| lens of the second partial system | −392.44 | 6.5 | −24.58 | | 1.52 | 63.96. |

8. A microscope, comprising:
an optical system arranged between a light source and a field diaphragm in an illumination beam path of the microscope;
wherein the optical system comprises:
n imaging optical elements with focal lengths $f_i$ and Abbe numbers $v_i$ (i=1, . . . , n) and for which the following relationship is met:

$$\sum_{i=1}^{n} \frac{h_i}{f_i \cdot v_i} \leq 0.07,$$

where $h_i$ is one half of the bundle diameter of a bundle of light rays proceeding from a point of the light source at the entrance to the imaging optical element i.

* * * * *